A. P. ANDERSON.
REFRIGERATING APPARATUS.
APPLICATION FILED JULY 15, 1915.

1,284,965.

Patented Nov. 19, 1918.
7 SHEETS—SHEET 1.

Fig. 1.

Witness:
John Enders

Inventor:
August P. Anderson
by Fred Gerlach
his Atty.

UNITED STATES PATENT OFFICE.

AUGUST P. ANDERSON, OF CHICAGO, ILLINOIS.

REFRIGERATING APPARATUS.

1,284,965.                Specification of Letters Patent.      Patented Nov. 19, 1918.

Application filed July 15, 1915. Serial No. 39,971.

*To all whom it may concern:*

Be it known that I, AUGUST P. ANDERSON, a resident of Chicago, in the county of Cook and State of Illinois, have invented certain new and useful Improvements in Refrigerating Apparatus, of which the following is a full, clear, and exact description.

The invention relates to refrigerating machines.

One object of the invention is to provide a refrigerating machine, including a refrigerant circulating line, which may be installed as a substantially complete unit or entity in an ordinary refrigerator.

A further object of the invention is to provide an improved refrigerating machine in which the motor for driving the compressor is inclosed, so that it can be installed with the remainder of the machine in a refrigerator.

A further object of the invention is to provide an improved refrigerating machine, including a motor for driving the compressor, in which the motor is inclosed and in which provision is made to prevent heat from the motor from being conducted to the chamber around the machine, to adapt the latter for installation in a refrigerator.

A still further object of the invention is to provide an improved refrigerating machine, in which the refrigerant circulating line is extended around the casing inclosing the compressor, condenser, receiver and motor, so that the machine as a whole will occupy but little space when placed in a refrigerator.

A still further object of the invention is to provide a refrigerating machine adapted for installation in a refrigerator and in which provision is made for circulating the refrigerant through brine in a tank installed as a part of the machine.

A still further object of the invention is to provide improved thermostatically controlled means for controlling the operation of the motor for driving the compressor.

A still further object of the invention is to provide an improved refrigerating machine which is provided with an insulated inclosing jacket which can be readily removed for access to the condenser and associated parts inclosed thereby.

Other objects of the invention will appear from the apparatus hereinafter described.

In the drawings: Fig. 7ª is a section on line 7ª—7ª of Fig. 7.

The improved apparatus comprises a casing having a chamber 17 therein adapted to contain the motor 18 for driving the compressor and the mechanism for operating the motor-switch, and a chamber 20 through which water is circulated and which contains a compressor 24, a condenser 25 and a refrigerant receiver 26.

The chamber 17 is formed in a body 14 comprising a base 15, three sides 16 and a top-wall 19. The fourth side of said body is formed by a removable head 31, to provide an opening for access to the motor chamber and parts therein and for placement and removal of the motor and said parts. Chamber 20 is formed in a hood 21 having a closed top 22 and a base flange 23 secured to the top-wall 19 by screws 27. A gasket is interposed between the flange 23 of wall 19 to prevent leakage of water from chamber 20.

A water-jacket 28 is formed in the sides and base of body 16 and a pipe 44 is provided to supply water to said jacket. Ducts 28' lead from the upper portion of the water-jacket 28 through top wall 19 into chamber 20 to deliver water into said chamber for circulation around the receiver, condenser and compressor after the water has passed through water-jacket 28, and the water escaping through an outlet pipe 50. The upper end of pipe 50 is open to receive water from the top of chamber 20 and its lower end is suitably connected and secured to wall 19, to deliver the water from chamber 20 into a duct 50' formed in one of the side walls of body 14. A pipe 50ª is connected to the base 15 to conduct water from duct 50' to the desired point of discharge. The circulation of the cooling water through a water-jacket around the chamber 17, containing the motor, is an important feature and serves to prevent the heat generated by the motor in operation from being conducted to the chamber surrounding the refrigerating apparatus, so that the refrigerating efficiency of the apparatus will not be decreased as a result of the operation of the motor in the refrigerator or refrigerating apparatus. A valve 46 controls the supply of water through pipe 44 to water-jacket 28 and chamber 20 and is automatically controlled by mechanism hereinafter set forth. The circulation of water through chamber 20, as aforesaid, cools the receiver, condenser, and compressor. It will be observed that all of the water-connections are disposed in body 14, so that the chamber 20 may be inclosed by hood 21 and by providing a closed top for the chamber containing the receiver, condenser and compressor, any gas escaping from any of the connections between said devices will be carried off through pipe 50 with the water. By avoiding water-connections extending through the hood, the latter may be secured in operative position after all of the connections have been made and may be removed without disconnecting any of the devices in chamber 20 or disturbing the water-connections.

Insulating material 48 is provided around the sides of body 14 and around all sides and the top of hood 21 and this material is held within a jacket 30 extending around the sides and top of said material. The purpose of insulating the walls of chambers 17 and 20 is to prevent heat transference between these chambers and the chamber of the refrigerator in which the refrigerating machine is installed. The removable head 31 for the opening in one side of body 14 is provided with inner and outer walls between which insulation 32 is placed to prevent heat transference between the chamber 17 and the outside of the casing.

A compressor 24 of any suitable construction and adapted to compress the refrigerant forces the refrigerant through a pipe 24' into the condenser coil 25 which discharges the compressed refrigerant into the refrigerant receiver 26. The compressor and receiver are secured to top-plate 19 of body 14. A duct 26ª extends through body 14 and a suitable pipe-connection 26ᵇ connects this duct and the receiver, so that the refrigerant in the receiver will pass through this duct. A pipe 26ᶜ is connected to the lower end of duct 26ª to conduct the refrigerant to the refrigerating coil 33. The refrigerating coil consists of a looped pipe disposed above the casing, as at 34, coiled around the upper portion of the casing, as at 35, loops 37 at one side of the casing and loops 38 disposed at the other side of the casing. The outlet terminal of coil 33 is connected by a union 37ª to a pipe 37ᵇ secured in the base of body 14 and communicating with a duct 33ª, extending vertically through said body. This duct 33ª extends through the top-plate 19 of body 14 and is connected by a suitable coupling 33ᵇ to a pipe 33ᶜ which leads to the inlet of the compressor. A pressure reducing valve 42 is provided in the refrigerating line for a purpose well understood in the art. A union coupling 40 connects the coil 33 to the pipe 26ᶜ. By forming the duct 33ª for the low pressure side of the refrigerant line and duct 26ª for the high pressure side of the refrigerant line in body 14 and providing unions 37ª and 40, the refrigerating coil may be connected to and disconnected from the apparatus within the casing while the receiver and condenser remain inclosed in the casing. This feature is of importance where an insulating jacket is provided around the casing containing the condenser, receiver and motor. The upper portion 34 of the refrigerating coil is supported on brackets 36 on the top of the jacket 30 and a freezing pan 39 for making a slab of ice may be placed on said portion of the refrigerating coil.

The apparatus thus far described exemplifies one in which the refrigerating coil is disposed around the casing containing the operating parts of the apparatus, so that the circulating line and the refrigerating mechanism may be installed as a unit in a refrigerator. The refrigerating coil does not extend in front of the removable head 31, so that access may be had to the motor chamber upon removal of said head and without disconnecting the refrigerating coil.

Motor 18, which is disposed in chamber 17, has one of its ends 18ª extended through an opening in one of the side walls of body 14 and through the jacket 30 and a pinion 85 is secured to the shaft of said motor and driven thereby. Pinion 85 meshes with a gear-wheel 86 to drive the compressor 24 in chamber 20. Gear 86 is secured to a crankshaft 87 which is journaled in a suitable bearing and stuffing box 88 and in a suitable bearing 89 provided in the crank-case 90 of the compressor. Shaft 87 is formed in sections having interfitting ends, as at 91. The bearing and packing box 88 are secured to the crank case by bolts 92 extending through flanges on the bearing and the crank case and through one of the side walls 21 of the hood. The crank-shaft is formed in sections to permit the bearing 88 and that section of the shaft to which the gear 86 is secured to be secured in position and removed from the outside of the casing.

In assembling the apparatus, bearing 88 is secured in position after the hood has been placed over the compressor and after the jacket 30 has been placed around the casing. If at any time it should be necessary to repair the compressor, the bearing 88 can be removed from the outside and with it the outer section of shaft 87 and gear 86 to make it possible to lift the hood and jacket 30 off the body 14.

In assembling the machine, motor 18 is placed in position in chamber 17, so that its end portion 18ᵃ will extend through jacket 30, after the latter has been placed in position. If removal of the jacket is desired, the motor can be drawn forwardly in chamber 17 to permit the jacket to be lifted away from body 14. An oil reservoir 94 is disposed in chamber 20 and a pipe 95 conducts lubricant from the reservoir to the bearings for the crank-shaft.

The apparatus is designed to be automatic in its operation, to compress the spent refrigerant whenever the temperature in the refrigerator rises above a predetermined point and to discontinue the operation of the motor when the temperature falls below a predetermined point. A thermostat 51, of any suitable construction placed in any desired part of the refrigerator, controls the operation of electrically operated start-and-stop mechanism for the motor 18. The operation of the latter is controlled by a switch 52 which controls a circuit (not shown) from a suitable source of potential. The key 53 of this switch is turned by a shaft 54 which is driven by power derived from a small electric motor 55 through a gear train 56. Switch 53 is adapted to alternately open and close the circuit for the motor 18 by successive quarter revolutions, so that when the shaft has been operated a quarter of a revolution to close said switch and circuit, it will remain stationary until the shaft and switch are operated another quarter of a revolution, to open the circuit.

The thermostat has three electrical contacts which are connected to three posts 57, 58 and 59 by conductors 60, 61 and 62, respectively. The conductor 61 is constantly connected to the thermostat-switch member 51ᵃ which is adapted to contact with the contact-terminal 51ᶜ of conductor 60 when the temperature rises sufficiently to render the operation of the compressor necessary, and with a contact terminal 51ᵇ when the temperature falls sufficiently in response to the circulation of the refrigerant in the refrigerating coil. The mechanism for controlling the operation of motor 55 and shaft 54 comprises a conductor disk 63 and projecting segments 64 which are electrically connected together and mounted on a wheel 67 of insulating material, a stationary contact 65 which engages ring 63, a brush-contact 66 adapted to ride on wheel 67 and segments 64, and a contact 68 secured to one side of wheel 67 and electrically connected to ring 63. Contact 68 is adapted to engage in rotative succession four stationary contacts 69, 70, 71 and 72. Contacts 69 and 71 are connected to post 57 by a conductor 73. Contacts 70 and 72 are connected to post 59 by a conductor 74. A battery 75 has its poles connected by conductor 75ᵇ, 75ᵃ to posts 76 and 77, respectively. Contacts 65 and 66 are insulated from each other by a block 65ᵃ. The small motor 55 for driving the shaft 54 is included in a conductor 78 which is connected to post 77 and contact 65 and post 58. A conductor 79 connects post 58 and post 76 and a conductor 80 connects post 76 and the contacts 66.

Shaft 54 extends through one side of body 14 and a sleeve 100 which extends through jacket 30 and is connected to turn the plug of water-valve 46, so that when the compressor is being operated by motor 18, valve 46 will be open to cause cooling water to flow through water-jacket 48 and chamber 20 and so that when the motor is inoperative, said valve will be closed. The plug of the latter is formed with a through port so that the valve will be alternately opened and closed by successive quarter revolutions of shaft 54.

The operation of the controlling mechanism will be as follows: Assuming the apparatus to be at rest and the temperature in the refrigerator rises to a point when the apparatus should be operated to compress the spent refrigerant, a circuit for operating motor 55 to rotate shaft 54 and operate switch 53 and valve 46 a quarter revolution, will be established as follows: battery 75, conductor 75ᵃ, post 77, conductor 78 in which the motor 55 is included, contact 65, disk 63, contact 68, contact 70 or 72, conductor 74, post 59, conductor 62, contact 51ᶜ, member 51ᵃ, conductor 61, post 58, conductor 79, post 76 and conductor 75ᵇ. After the motor 55 has been operated sufficiently to bring contact 66 into engagement with one of the segments 64 and before contact 68 leaves either of the contacts 72, 70, the circuit for causing the operation of the motor 55 to continue until a quarter revolution of shaft 54 has been completed will be established as follows: battery 75, conductor 75ᵃ, post 77, conductor 78, in which the motor 55 is included, contact 65, disk 63, ring 64, contact 66, conductor 80, post 76 and conductor 75ᵇ. When the contact 66 passes off the projecting segment of ring 64, the last mentioned circuit will be interrupted at said contact and motor 55 will stop, and shaft 54 will have been operated a quarter revolution to close switch 52 and cause the motor 18 to operate the compressor through pinion 85 and gear 86 on the crank-shaft 87 of the compressor until switch 52 is again operated. When motor 55 stops, while motor 18 is being operated, contact 68 will engage one of the contacts 69, 71. When the temperature in the refrigerator has been lowered to the desired point, the thermostatic switch member 51ᵃ will make contact with the terminal 51ᵇ of conductor 60 to establish a circuit for operating the controlling mechanism to open the switch 52 for motor 18 as follows: battery 75, conductor 75ᵃ, post 77, conductor 78, in which motor 55 is included, contact 65, disk 63, contact 68, one of the contacts 69, 71, conductor 73, post 57, conductor 60, contact 51ᵇ, member 51ᵃ, conductor 61, post 58, conductor 79, post 76 and conductor 75ᵇ. After the motor 55 has been operated initially, contact 66 will engage the next succeeding projection on ring 64 and complete a circuit as follows: battery 75, conductors 75ᵃ, 78, contact 65, disk 63, ring 64, contact 66, conductor 80, post 76 and conductor 75ᵇ. When contact 65 rides off said projection, shaft 54 will have been operated a full quarter revolution to stop the motor 18 and close valve 46. Contact 68 will then be in engagement with one of the contacts 70, 72 and the circuit will remain open until the thermostat is again operated to close the circuit for again starting the motor 55. This controlling mechanism exemplifies means for automatically starting and stopping the inclosed motor 18 to cause the compressor to be operated responsive to variations in temperature in the refrigerator between predetermined points.

The casing is placed upon a bed 101 of cork or other suitable insulating material to prevent heat transference between the casing and the support in the refrigerator upon which the apparatus is installed.

Figure 1:
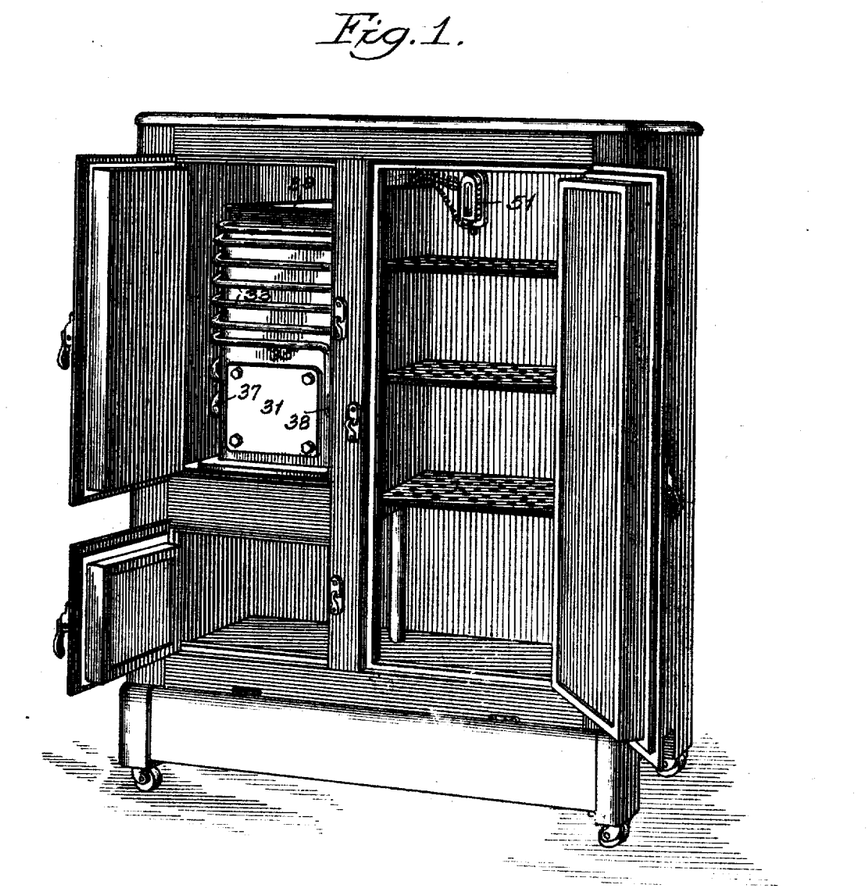
Figure 1 is a perspective of a refrigerator with the improved refrigerating apparatus installed therein the brine tank being omitted.
Figure 2:
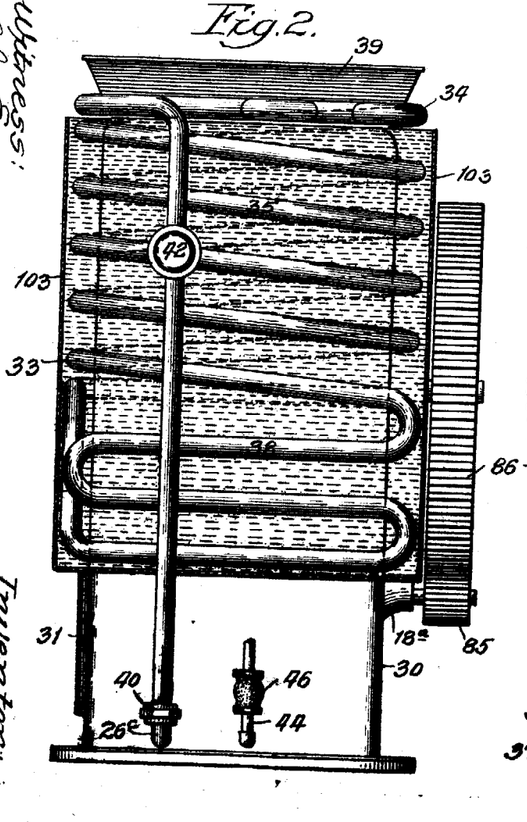
Fig. 2 is an elevation of one side of the refrigerating machine, the brine tank being shown in section.
Figure 3:
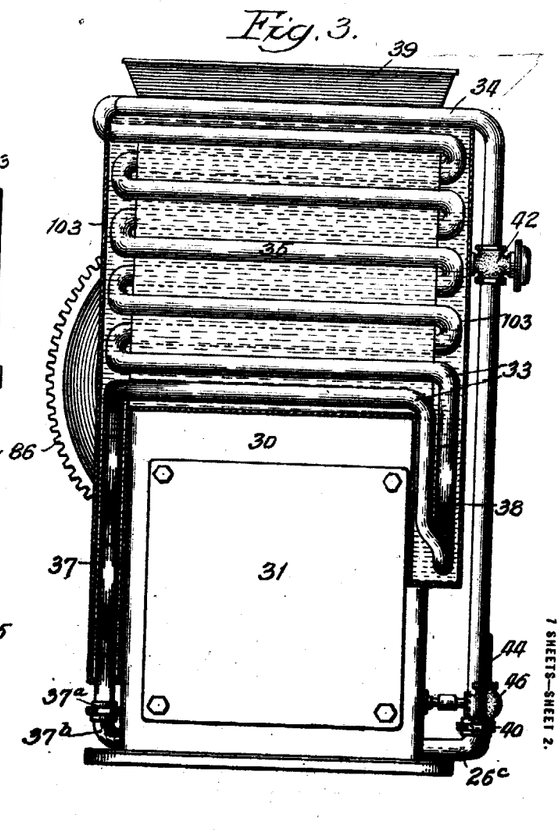
Fig. 3 is an elevation of another side, the brine tank being shown in section.
Figure 4:
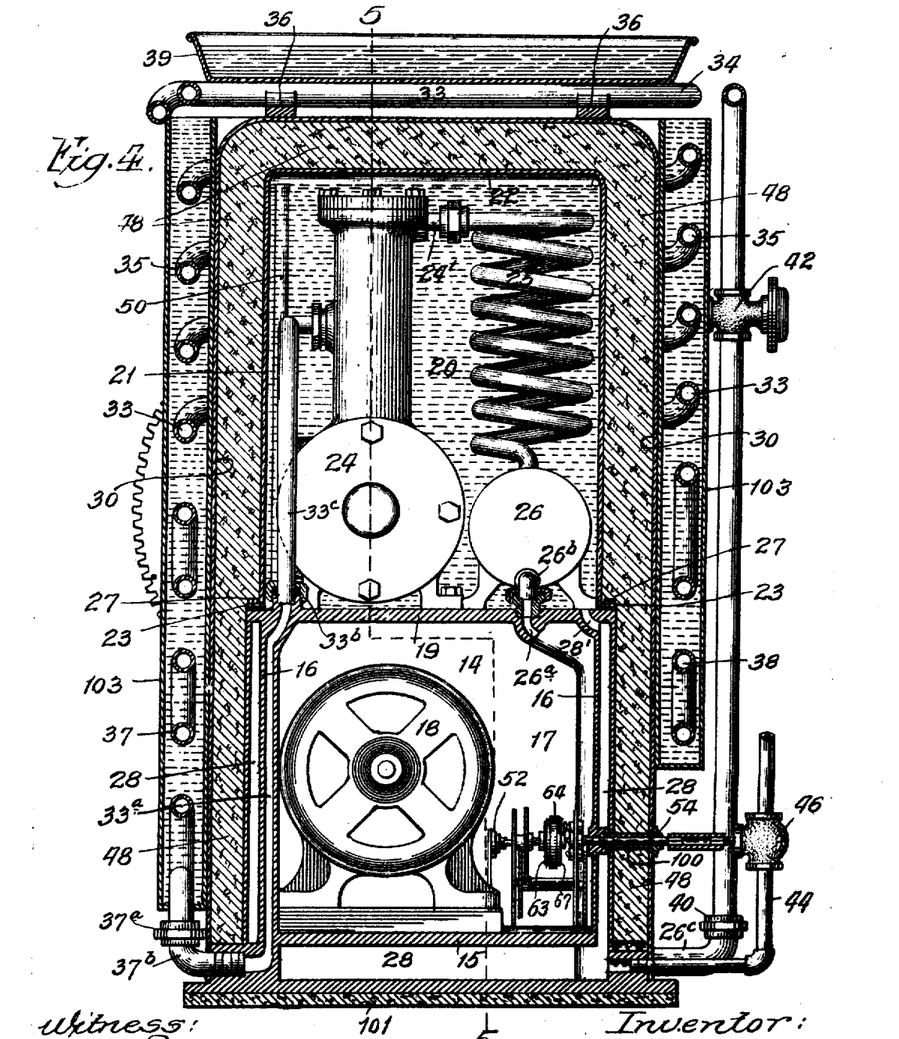
Fig. 4 is a vertical section, parts being shown in elevation.
Figure 5:
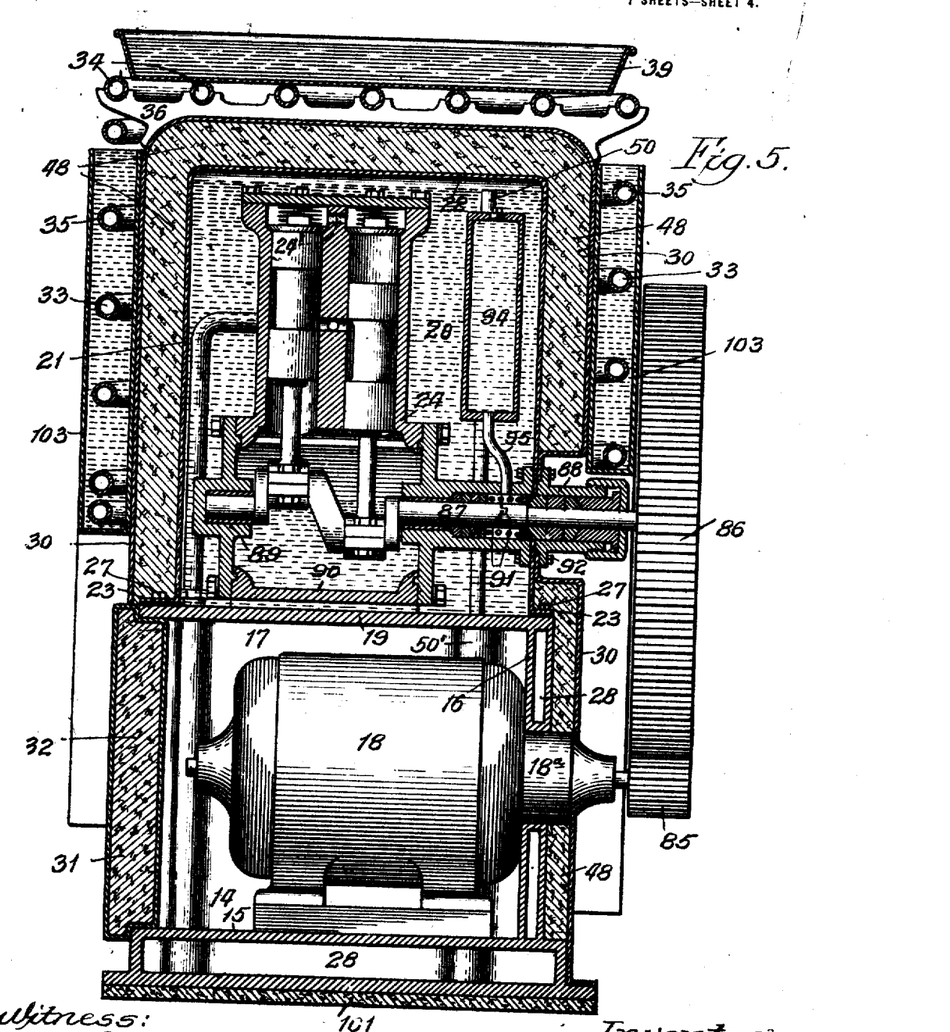
Fig. 5 is a section taken on line 5—5 of Fig. 4.
Figure 6:
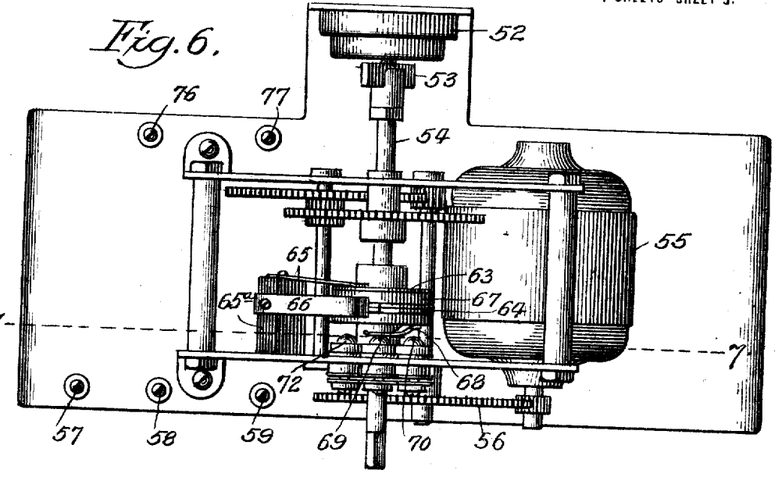
Fig. 6 is a plan of the mechanism for operating the switch for controlling the motor which drives the compressor.
Figures 7, 7A:
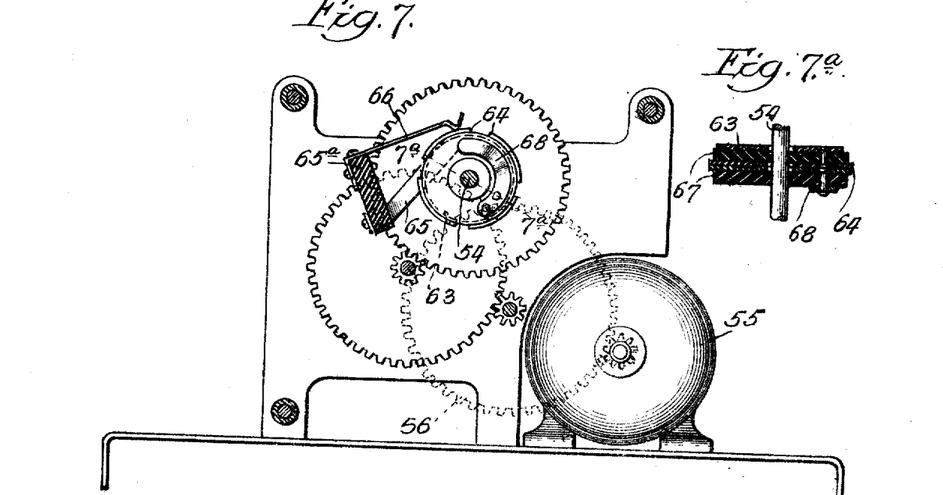
Fig. 7 is a section taken on line 7—7 of Fig. 6.
Figure 8:
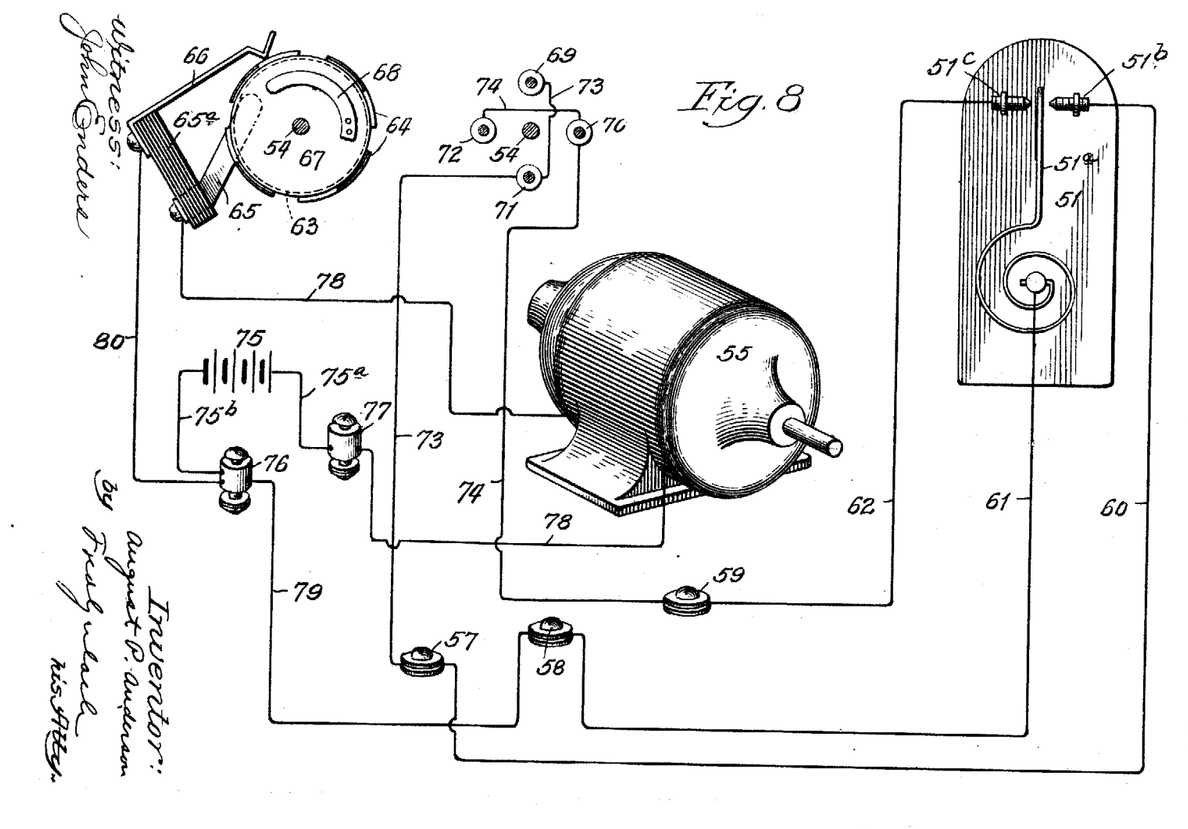
Fig. 8 is a diagram of the electrical connections for the mechanism for operating and controlling the switch for the motor.
Figure 9:
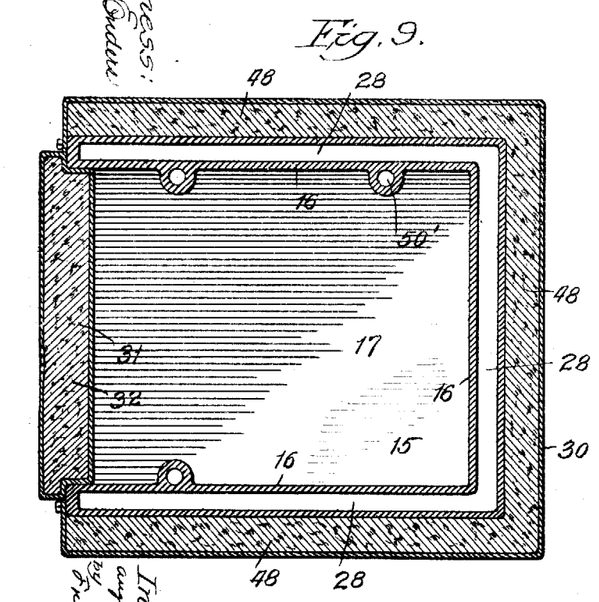
Fig. 9 is a horizontal section through the lower portion of the casing.
Figures 10, 11:
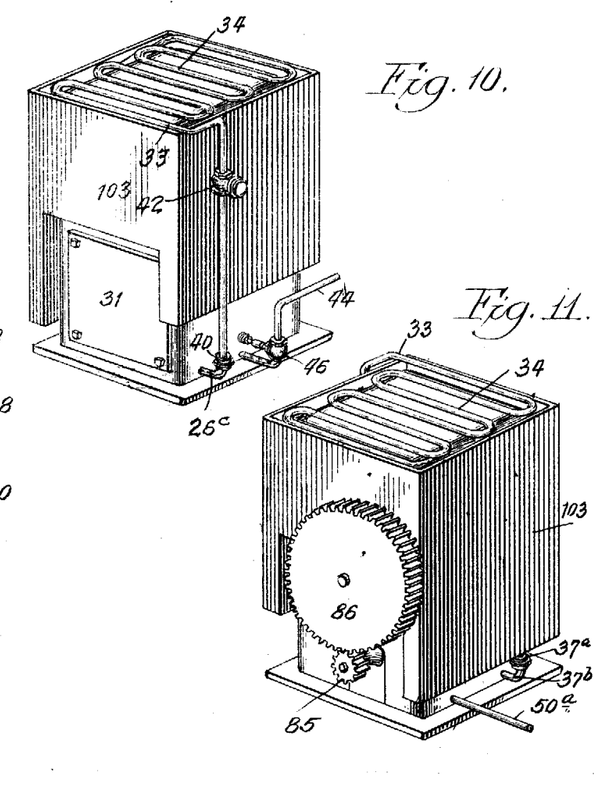
Figs. 10 and 11 are perspectives viewed from opposite sides of the apparatus.

In some instances, it is desirable to provide a body of brine or other suitable retaining agent, and when this is desired, a brine tank 103, adapted to fit around the jacket 30, as shown in Figs. 2, 3, 4, 10 and 11, is provided. This tank comprises inner and outer and bottom walls and the refrigerating coil 33 is disposed in the tank so that the brine will be cooled by the refrigerant. This tank is removable from the jacket with the refrigerant coil 33 contained therein. At the front of the casing, the bottom of the brine tank is disposed above the removable head 31 so that the removal of said head for access to the motor chamber will not be interfered with by the tank.

In assembling the apparatus, the compressor, condenser and receiver are placed in position upon the top 19 of body 14 and the refrigerant connections can be readily made because the ducts for the high and lower pressure sides of the line are provided in the body 14. The hood 21 is then secured upon the top of body 14. The jacket and insulating therein will next be placed around the casing. The brine tank and refrigerating coil will then be placed around the jacket 30. The motor can readily be installed in chamber 17 from the open front of body 14 after the insulating jacket has been placed in position. The bearing 88 with the outer section of the shaft 87 will then be secured in place. The shaft 54 for operating the water valve 46 can be extended through the body 14 and jacket 30 from the inside of chamber 17. The remaining pipe connections for the refrigerating coil and supply of cooling water can be made from the outside either after or before the jacket has been placed in position. To install the apparatus in a refrigerator, the assembled apparatus is placed therein and it is only necessary to connect the water-supply and discharge-pipes to the base of body 14 and make the necessary electrical connections for the motor 18 and the thermostat to complete the installation. In event repairs are necessary to the compressor, the apparatus may be dismantled by disconnecting and removing the refrigerant coil and brine tank, moving the motor 18 in chamber 17 to withdraw its projecting end 18ᵃ from the jacket 30, removing bearing 88 with the outer shaft section of the crank shaft of the compressor, and lifting off the jacket 30 and removing the insulation, which will give access to the hood 21 so that it can be removed.

The invention thus exemplifies an improved refrigerating machine which is particularly adapted to be installed as a substantially complete unit in the ice chamber of an ordinary refrigerator. The refrigerating coil is looped and coiled around the casing containing the operating mechanism, so that the apparatus as a whole will occupy little space in a refrigerator. The motor for operating the compressor is incased so that it can be installed with the compressor, and provision is made for preventing the heat, resulting from the operation of the motor, from being conducted to the chamber around the casing. Provision is made for a brine tank around the casing. The connections for the refrigerant and water lines extend through the body containing the motor and serving as a base for the compressor and receiver, so that the necessity of extending these lines through the sides of the casing or jacket is avoided. The apparatus can be readily assembled and dismantled in event repairs are necessary.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In refrigerating apparatus, the combination with an inclosing structure having a chamber therein, of a refrigerant line disposed in and for cooling said chamber, a compressor, and a condenser connected to said line, a case completely inclosing the compressor and condenser and adapted to contain water to flow around the condenser and compressor, said case being disposed in said structure, means for supplying water to said case, and means for preventing heat transference between the case and the space in the structure containing the refrigerant line.

2. In refrigerating apparatus, the combination with an inclosing structure having a chamber therein, of a refrigerant line disposed in and for cooling said chamber, a compressor, a condenser, and a receiver connected to said line, a case completely inclosing the compressor, condenser and receiver and adapted to contain water to flow around the condenser, compressor and receiver, said case being disposed in said structure, means for supplying water to said case, and means for preventing heat transference between the case and the space in the structure containing the refrigerant line.

3. In refrigerating apparatus, the combination with an inclosing structure having a chamber therein, a refrigerant line disposed in and for cooling said chamber, a compressor, a condenser and a receiver connected to said line, a case completely inclosing the compressor, condenser and receiver and adapted to contain water to flow around the contents of the case, a motor for driving the compressor disposed within the structure, said case being disposed in the structure, means for supplying water to said structure, and means for preventing heat transference between the case and the motor and the space in the structure containing the refrigerant line.

4. In refrigerating apparatus, the combination of a compressor, a condenser, a receiver, a motor for driving the compressor, a case completely inclosing the receiver, compressor, condenser and motor and adapted to contain water, means for supplying water to the case, to flow around the compressor and condenser, insulating-means around the case to prevent heat transference between the contents of the case and the outside thereof, and a refrigerant line connected to the compressor and receiver and extended to the outside of the case.

5. In a refrigerating apparatus, the combination of an inclosing structure having a chamber therein, of a refrigerant line for cooling said chamber, a compressor and a condenser connected to said line, and a case completely inclosing the compressor and condenser and adapted to contain water to flow around its contents, means for supplying water to said case, the case being disposed within the structure, said line comprising coils extending around and in proximity to said case.

6. In refrigerating apparatus, the combination of a compressor, a condenser, a receiver, a case containing the receiver, compressor, and condenser, and adapted to contain water, means for supplying water to and causing it to flow through the case, an insulating-jacket around the case and a refrigerant line connected to the compressor and condenser and comprising coils around the jacket.

7. In refrigerating apparatus, the combination of a compressor, a condenser, a receiver, a motor for driving the compressor, a case containing the receiver, compressor, condenser and motor, and adapted to contain water, means for supplying water to the case to flow around the compressor and condenser, and a refrigerant line connected to the compressor and receiver and comprising coils around the case.

8. In refrigerating apparatus, the combination of a compressor, a condenser, a receiver, a motor for driving the compressor, a case containing and completely inclosing the receiver, compressor, condenser and motor, and adapted to contain water, means for supplying water to the case to flow around the compressor and condenser, an insulating jacket around the case, and a refrigerant line connected to the compressor and receiver and comprising coils around the jacket.

9. In refrigerating apparatus, the combination of a compressor, a condenser, a refrigerant line connected to the compressor, a case having a chamber containing the compressor and condenser and adapted to contain water, means for supplying water to and causing it to flow through said chamber, the case having another chamber therein and a motor for driving the compressor disposed in the latter chamber.

10. In refrigerating apparatus, the combination with an inclosing structure having a refrigerating space therein, of a compressor, a condenser, a receiver, a refrigerant line connected to the compressor and receiver, a case having a chamber containing the compressor, condenser, and receiver, and adapted to contain water, means for supplying water to and causing it to flow through said chamber, the case having another chamber therein, and a motor for driving the compressor disposed in said latter chamber, said case being disposed in said structure.

11. In refrigerating apparatus, the combination with an inclosing structure having a refrigerating space therein, of a compressor, a condenser, a refrigerant line connected to the compressor and receiver, a two-part case, one part having a chamber for containing the compressor and condenser, and adapted to contain water, means for supplying water to and causing it to flow through said chamber, the other part of the case having a chamber therein, and a motor for driving the compressor disposed in the latter chamber, said case being disposed in said structure.

12. In refrigerating apparatus, the combination of a compressor, a condenser, a receiver, a refrigerant line connected to the compressor and to the receiver, a case having a chamber containing the compressor, condenser and receiver, and adapted to contain water, means for supplying water to and causing it to flow through said chamber, the case having another chamber therein, a motor for driving the compressor, disposed in said latter chamber, means for controlling the operation of the motor, and an insulating jacket extending entirely around said case.

13. In refrigerating apparatus, the combination of a compressor, a condenser, a refrigerant line connected to the compressor, a case having a chamber therein, a motor for driving the compressor, disposed in said chamber, means for controlling the operation of the motor, and a water-jacket around said chamber.

14. In refrigerating apparatus, the combination of a compressor, a condenser, a refrigerant line, connected to the compressor, a case having a chamber containing the compressor, and condenser, and adapted to contain water, the case having another chamber therein, a motor for driving the compressor, disposed in the latter chamber, a water-jacket around said latter chamber, and connections for causing water to flow through the jacket and the chamber containing the compressor and condenser.

15. In refrigerating apparatus, the combination of a compressor, a condenser, a refrigerant line, connected to the compressor, a case having a chamber therein, a motor for driving the compressor, disposed in said case, means for controlling the operation of the motor, a water-jacket around said chamber, and an insulation around the water-jacket.

16. In refrigerating apparatus, the combination of a compressor, a condenser, a refrigerant line connected to the compressor, a case having a chamber containing the compressor and condenser, and adapted to contain water, the case having another chamber therein, a motor for driving the compressor, disposed in said latter chamber, a water-jacket around said latter chamber, an insulating jacket around the case, and connections causing water to circulate through said water-jacket and the chamber containing the compressor.

17. In refrigerating apparatus, the combination of a compressor, a condenser, a refrigerant line, a case having a chamber containing the compressor and condenser, and adapted to contain water, said case comprising a body having a chamber therein, and a motor for driving the compressor, disposed in said chamber, said body having ducts therein included in the refrigerant line.

18. In refrigerating apparatus, the combination of a compressor, a condenser, a refrigerant line, a case comprising a hood, inclosing the compressor, and condenser, and adapted to contain water, and a body on which the hood is mounted, having a chamber therein, and a motor for driving the compressor, disposed in said chamber, said body having ducts therein included in the refrigerant line.

19. In refrigerating apparatus, the combination of a compressor, a condenser, a receiver, a case comprising a hood containing the compressor, condenser, and receiver, and a body on which the hood is mounted having a chamber therein, a motor for driving the compressor, disposed in said chamber and a refrigerant line extended around the case, said body having refrigerant ducts therein connected to the refrigerant line.

20. In refrigerating apparatus, the combination of a compressor, a condenser, a receiver, a case comprising a compressor, condenser, and receiver, and adapted to contain water, and a body having a chamber therein, a motor for driving the compressor disposed in said chamber, a refrigerant line disposed around the case, said body having ducts therein included in the refrigerant line and insulation around the case.

21. In refrigerating apparatus, the combination of a compressor, a condenser, a receiver, a refrigerant line connected to the compressor and the receiver, a case comprising a hood containing the compressor, condenser and receiver, and adapted to contain water, and a body having a chamber therein and a motor for driving the compressor, disposed in said chamber, said body having ducts therein for conducting water to and from the hood.

22. In refrigerating apparatus, the combination of a compressor, a condenser, a receiver, a refrigerant line, a case comprising a hood containing the compressor, condenser, and receiver, and adapted to contain water, and a body having a chamber therein, a motor for driving the compressor, disposed in said chamber, said body having ducts included in the refrigerant line and ducts for conducting water to and from the hood.

23. In refrigerating apparatus, the combination of a compressor, a condenser, a receiver, a refrigerant line, a case comprising a hood containing the compressor, condenser, and receiver, and adapted to contain water, and a body having a chamber therein, a motor for driving the compressor, disposed in said chamber, said body having ducts therein included in the refrigerant line, and ducts for conducting water to and from the hood and insulation around the case.

24. In refrigerating apparatus, the combination of a compressor, a refrigerant line connected to the compressor, a case having a chamber therein, a motor for driving the compressor disposed in said chamber, a switch for controlling the operation of the motor, means for thermostatically controlling the operation of the switch, comprising a motor also disposed in said chamber, and means for causing the latter motor to operate for predetermined periods.

25. In refrigerating apparatus, the combination of a compressor, a condenser, a receiver, a refrigerant line, connected to the compressor and the receiver, a case having a chamber containing the compressor, condenser and receiver and adapted to contain water, a motor for driving the compressor, a switch for controlling the operation of said motor, means for thermostatically controlling the operation of the switch, comprising a motor and connections for causing the latter motor to operate for predetermined periods, a valve for controlling the flow of water through the case, and means operated by the latter motor for operating said valve.

26. In refrigerating apparatus, the combination of a compressor, a condenser, a receiver, a refrigerant line, connected to the compressor and the receiver, a case containing the compressor, condenser, and receiver, a motor for driving the compressor, means for thermostatically controlling the operation of the motor, and a brine tank around the case, and into which the refrigerant line is extended.

27. In refrigerating apparatus, the combination of a compressor, a condenser, a receiver, a refrigerant line, connected to the compressor and the receiver, a case containing the compressor, condenser, and receiver, a motor for driving the compressor also disposed in said case, means for thermostatically controlling the operation of the motor, and a brine tank around the case, into which the refrigerant line is extended.

28. In refrigerating apparatus, the combination of a compressor, a condenser, a receiver, a refrigerant line, connected to the compressor and the receiver, a case containing the compressor, condenser and receiver, a motor for driving the compressor, means for thermostatically controlling the operation of the motor, a brine tank around the case and into which the refrigerant line is extended and insulation between the case and the tank.

29. In refrigerating apparatus, the combination of a compressor, a condenser, a receiver, a refrigerant line, a case comprising a body having a chamber therein, and a hood on the top of said body containing and completely inclosing the compressor, condenser and receiver, a motor for driving the compressor disposed in said chamber, a removable head on one side of the body, and thermostatic means for controlling the operation of the motor.

30. In refrigerating apparatus, the combination of a compressor, a condenser, a receiver, a refrigerant line, a case comprising a body having a chamber therein, and a hood on the top of said body containing and completely inclosing the compressor, condenser and receiver, a motor for driving the compressor disposed in said chamber, a removable head on one side of the body, thermostatic means for controlling the operation of the motor, and insulating means around the body and the hood.

31. In refrigerating apparatus, the combination of a compressor, a condenser, a receiver, a refrigerant line, a case comprising a body having a chamber therein, and a hood on the top of said body containing the compressor, condenser and receiver, a motor for driving the compressor disposed in said chamber, a removable head on one side of the body, means for controlling the operation of the motor, and insulating means around the body and the hood and under the body.

32. In refrigerating apparatus, the combination of a compressor, a condenser, a receiver, a refrigerant line, a case comprising a body having a chamber therein, and a hood on the top of said body containing and completely inclosing the compressor, condenser and receiver and adapted to contain water, a motor for driving the compressor disposed in said chamber, a removable head on one side of the body, means for controlling the operation of the motor, connections for water and the refrigerating line at the base of said body, and insulating-means around the body and the hood.

33. In refrigerating apparatus, the combination of a compressor, a condenser, a receiver, a refrigerant line, a case comprising a body having a chamber therein, and a hood on the top of said body containing and completely inclosing the compressor, condenser and receiver and adapted to contain water, a motor for driving the compressor disposed in said chamber, a removable head on one side of the body, means for controlling the operation of the motor, connections for water and the refrigerating line at the base of said body, and insulating means around the body and the hood and under the body.

AUGUST P. ANDERSON.

Witnesses:
MILDRED STUMPF,
KATHARINE GERLACH.